May 12, 1959

M. W. PETERSON 2,886,114

IMPLEMENT ADJUSTING MECHANISM

Filed Nov. 14, 1955

INVENTOR:
Merton W. Peterson
by James E. Nilles
Attorney

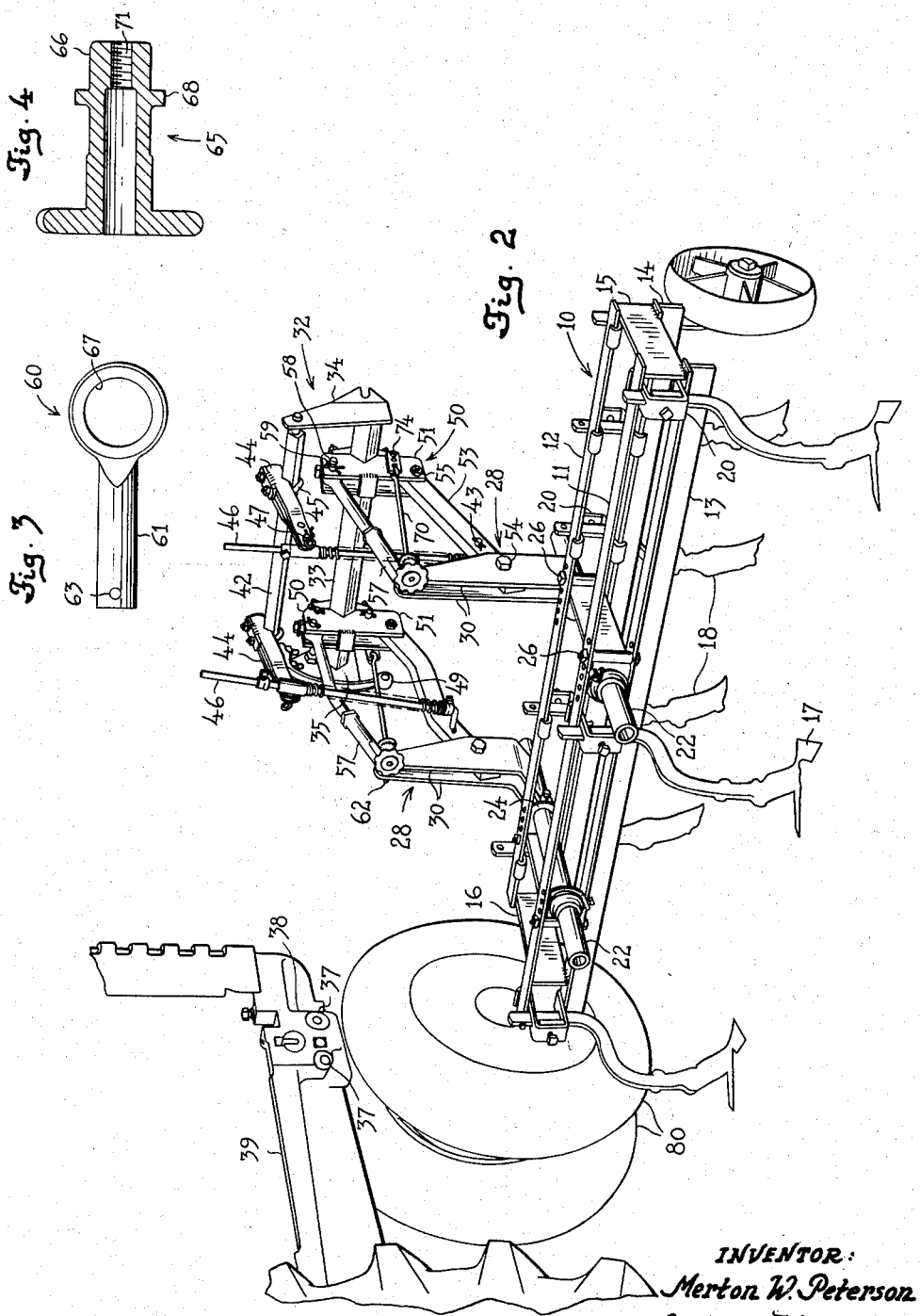

United States Patent Office 2,886,114
Patented May 12, 1959

2,886,114
IMPLEMENT ADJUSTING MECHANISM

Merton W. Peterson, Whitewater, Wis., assignor to Massey-Ferguson, Inc., a corporation of Maryland Application November 14, 1955, Serial No. 546,341

3 Claims. (Cl. 172—273)

This invention relates to cultivators, or earth working implements, which are adapted to be detachably mounted on a tractor. It relates, more particularly, to implement rigs of the type in which the tools are vertically positionable, so as to vary their working depth, by means of parallel arm connections. These connections permit the tools to maintain a constant attitude to the ground regardless of the depth at which they are set.

Implement rigs of this type are usually very heavy and large, particularly when of the multiple row type. They are difficult to position and align with the mating brackets or apertures on the tractor by which they are secured to the latter. In many cases it is virtually impossible for one man to position these rigs next to the tractor, align the mating parts and secure them together.

Various proposals have been made in the past for guiding the implement frame into position relative to the tractor and thereby facilitating the connections. Holding stands have proved useful in supporting the detached implement on the ground in the approximate position so as to aid in making the hook-up. These devices, while useful, add to the cost of the unit and are usually cumbersome in themselves, get out of alignment and often are misplaced. They also contribute to a general untidy appearance of the assembly. Furthermore, as the tractor assumes a different position, relative to the ground, when the implement is detached, these holding stands are incapable of maintaining alignment between the tractor and implement frame.

It is an object of this invention to provide an implement rig for attachment to a tractor having a simple and efficient means for holding the attaching frame relative to the ground whereby attachment to the tractor is facilitated, said means including adjusting means for quickly aligning the attaching frame with its mating connecting means on the tractor.

It is a more specific object of the invention to provide a simple means for locking the parallel arms of an implement rig from swinging, and thereby holding the attaching frame in position. These means are adapted to adjust the attaching frame vertically so as to align it with the mating connecting points on the tractor. These means are adapted to be quickly stored on the frame when not in use and are thereby readily available for use when needed.

Other objects and advantages will become more apparent as this disclosure progresses, reference being had to the attached drawings wherein a preferred embodiment of the invention is illustrated.

Figure 2 is a perspective view of the device shown in Figure 1, but detached from the tractor.

Figure 3 is an elevational view, on an enlarged scale, of the pin for attaching the upper parallel arm.

Figure 4 is a sectional view, on an enlarged scale, of the adjusting knob.

Figure 1:
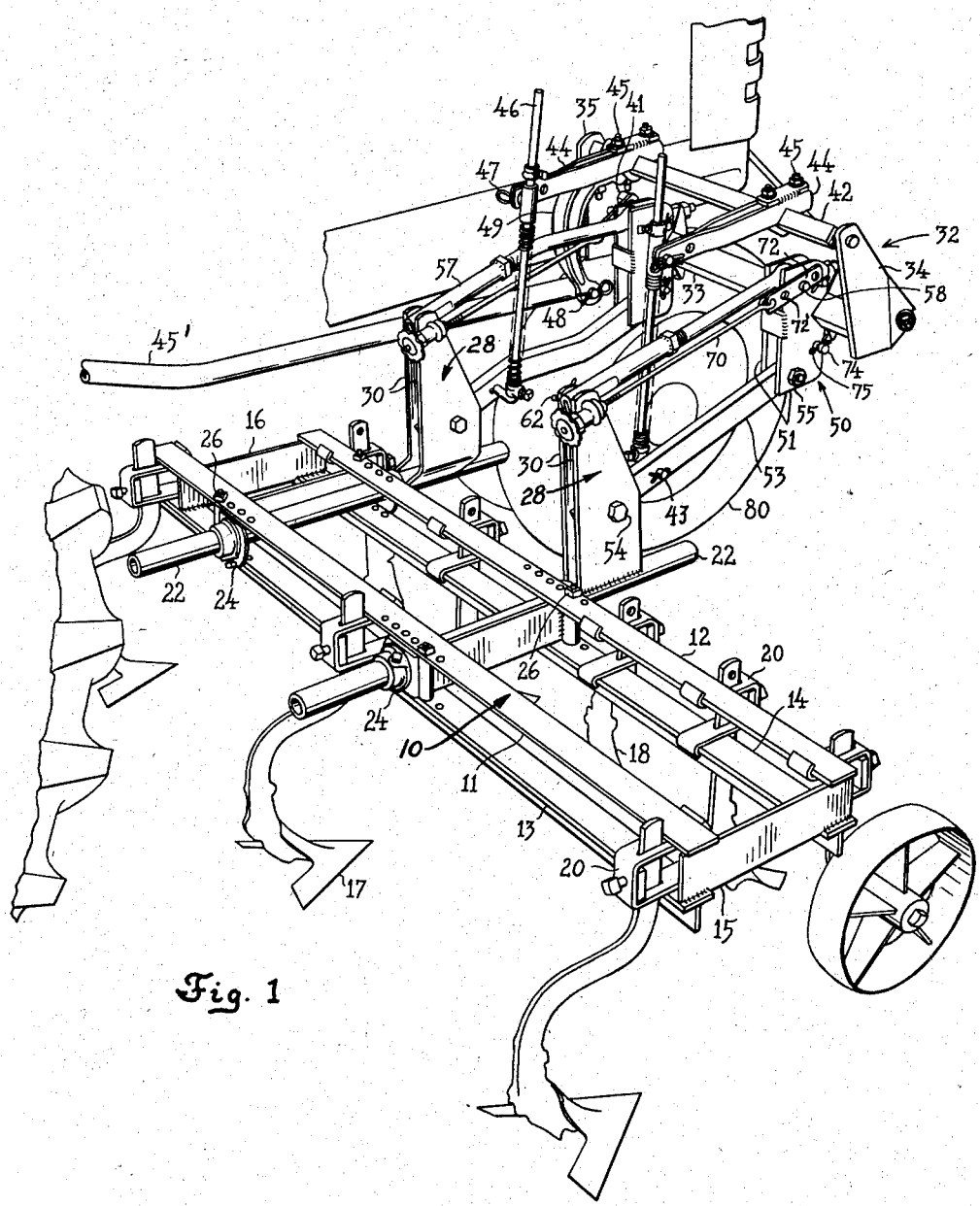
Figure 1 is a perspective view of the invention as applied to a cultivating rig attached to a tractor and the tools being in operating oposition.

Referring more particularly to the drawings the entire implement assembly comprises an implement frame 10 comprising transversely arranged, spaced tool bars 11, 12, 13 and 14 which are rigidly secured together by cross member 15, 16, as by welding. Ground engaging tools 17, 18 are adjustably secured along by the tool bar brackets 20 in the conventional manner. Cross shafts 22 are rotatably secured in bearing brackets 24 which in turn are rigidly secured to the tool bars by bolt means 26 extending therethrough. Secured by welding to the forward ends of shafts 22 are vertically arranged standards 28 comprised of spaced parallel plates 30.

The implement assembly also includes an attaching frame 32 comprised of a bar 33 of square cross section which has rigidly secured at its outer end an upstanding plate 34. Rigidly secured as by welding to the inner end of bar 33 is an attaching portion in the form of an attaching plate 35 having apertures therethrough (not shown) which are adapted to register with connecting elements in the form of tapped holes 37 in the mounting pad 38 of tractor frame 39. Cap bolts 41 (only one shown in Figure 1) extend through apertures in plate 35 and are threadably engaged in tapped holes 37. Rotatably mounted at either end in the upper portions of plates 34, 35 is a jackshaft 42. Rigidly secured by U bolt means 45, at spaced locations along jackshaft 42 are arms 44. Conventional lift rods 46 are connected by pins 47 to the free ends of arms 44 and extend downwardly therefrom. The lower ends of rods 46 are bent and extend through the lower parallel arm 53 as at 43. The jackshaft 42 is oscillated by the control shaft 45' (Figure 1) which is connected by pin 48 to the arm 49 which in turn is rigidly secured to jackshaft 42. Thus, as the jackshaft is oscillated, the implement frame 10 is vertically positioned through lift rods 46 in the well known manner. Adjustably secured to bar 33 are brackets 50 comprised of spaced parallel plates 51 which are rigidly secured together. As the parallel arm connections between each bracket 50 and its aligned standard 28 are substantially the same, only one will be described. Furthermore, the adjustable holding means for each pair of parallel arms is similar and the description of one is believed to be sufficient. A pair of vertically spaced, parallel arms are connected between the attaching and implement frames as follows. A lower parallel arm 53 is pivotally secured at its rear end between the plates 30 of standard 28 by bolt means 54 which extends through aligned apertures in plates 30 and arm 53. The front end of arm 53 is pivotally secured between plates 51 of bracket 50 by bolt means 55 extending through aligned apertures in plates 51 and arm 53. An upper parallel arm 57, which is telescopingly adjustable in length, is pivotally connected at its forward end between plates 51 by a pin 58 extending through apertures in plates 51 and held captive therein by a cotter key 59. Pin 58 extends outwardly from bracket 50 a short distance for purposes that will appear hereinafter.

A locking arrangement is provided which is capable of locking, in a fixed position, the parallelogram formed by the parallel arms 53, 57, standard 28 and bracket 50. The form which this locking arrangement takes for illustrative purposes is a tension member shown as rod 70. Other alternative forms will become apparent to those skilled in this art, such as lengths of chain. The details of the embodiment shown here are as follows. An eyebolt, or pin 60, shown best in Figure 3, has a shank portion 61 which extends through aligned apertures in the upper end of the standards 30 and the rear end of upper arm 57. The pin 61 is held captive by the cotter key 62 inserted in aperture 63 of the pin. An adjusting knob 65 shown clearly in Figure 4 has a portion 66 which is adapted to extend through opening 67 of the eyebolt 61. Shoulder 68 of the knob bears against the eyebolt when in assembled relationship. Thus eyebolt 60 serves as a pivot for the upper arm 57 and also serves as a connection for rod 70. Rod 70 is threadably engaged at its rear end in the threaded portion 71 of the knob 65 and the front end of rod 70 terminates in a hook portion which engages one of a series of apertures 72' in the flat strap 72. One of apertures 72' is adapted to receive the pin 58, as shown in Figure 1, when the implement is attached to the tractor and the holding rod means is not used. In this position the rod 70 is parallel to upper arm 57 and uses the same pivot points of connection as arm 57. Therefore, when in the non-locking position, rod 70 causes no binding of the parallel arms in their vertical swinging movement. A locking pin 74 extends through bracket 50 and is held captive therein by key 75. One of the apertures 72' in strap 72 is adapted to fit over an extending portion of pin 74 when the implement frame is to be detached from the tractor. In other words, holding or locking means are provided which extend substantially diagonally across the parallelogram which is formed by the parallel arms and the implement and attaching frames. This holding means prevents the attaching frame from moving downwardly, by holding the parallelogram, or quadrilateral, in position. Adjusting means are provided for the holding means which permits the vertical positioning of the attaching frame as follows. The knob 65 is turned so as to draw up the rod 70 by its threaded portion and thereby take up any slack between rod 70 and plate 72. When this is done the attaching frame 32 may be detached from the tractor and it will maintain its position relative to the ground as shown in Figure 2. The earth working tools themselves remain on the ground and support the entire unit. It should be noted here that when the heavy implement framework is detached from the tractor, the latter raises from the ground due to the weight being relieved from the front tractor tires 80. In other words, the air pressure in the tires causes the tractor frame to rise slightly. Therefore, the holes 37 on the tractor frame are no longer aligned with the mating holes on the implement attaching frame. By providing the threaded adjustment between knob 65 and rod 70, the knob can be tightened to raise the attaching frame 32 and thereby once again align the mating holes when it is desired to reattach the frame.

What is desired to be secured by Letters Patent is:

1. An implement rig for attachment with a tractor having a pair of connecting elements disposed substantially above ground level, said rig comprising, in combination, an implement frame having means for carrying ground working tools, an attaching frame having connecting elements positionable for cooperation with the connecting elements on the tractor for coupling the rig to the tractor, means connecting said attaching frame to said implement frame including a pair of linkages spaced apart laterally of said frames, each of said linkages including two rigid arms disposed in parallel relation and spaced apart vertically, each of said arms being pivotally connected at one end to the attaching frame and at the other end to the implement frame to provide for relatively vertical movements of the frames, a two part rod having one part pivotally connected at one end to said implement frame and the other part adapted to be variably pivoted to said attaching frame, the pivots for said rod being positioned relative to the pivots for said arms so as to dispose the rod diagonally between said arms, said rod being operative to restrain the arms against pivoting movement and thereby hold the attaching frame in a fixed position relative to the implement frame determined initially by the connection of said other part, and means for varying the effective length of said one part of the rod to shift said attaching frame upwardly or downwardly to establish a final position of the attaching frame for aligning the connecting elements thereon with the connecting elements of the tractor.

2. An implement rig for attachment with a tractor having a pair of connecting elements disposed substantially above ground level, said rig comprising, in combination, an implement frame having means for carrying ground working tools, an attaching frame having connecting elements positionable for cooperation with the connecting elements on the tractor for coupling the rig to the tractor, means connecting said attaching frame to said implement frame including a pair of linkages spaced apart laterally of said frames, each of said linkages including two rigid arms disposed in parallel relation and spaced apart vertically, each of said arms being pivotally connected at one end to the attaching frame and at the other end to the implement frame to provide for relatively vertical movements of the frames, a rod having means spaced apart along its length for pivotal connection selectively with one of said frames, means at the other end of said rod for pivotal connection with the other of said frames, the pivots for said rod being located so as to position it diagonally of said arms and thereby enable the rod to retain the attaching frame in a fixed position relative to the implement frame, such fixed position being determined by the particular connecting means at said one end of the rod selected for connection with the frame, and other means operable to vary the effective length of said rod to adjust the attaching frame upwardly or downwardly relative to the selected fixed position.

3. An implement rig for attachment with a tractor having a pair of connecting elements disposed substantially above ground level, said rig comprising, in combination, an implement frame having means for carrying ground working tools, an attaching frame having connecting elements positionable for cooperation with the connecting elements on the tractor for coupling the rig to the tractor, means connecting said attaching frame to said implement frame including a pair of linkages spaced apart laterally of said frames, each of said linkages including two rigid arms disposed in parallel relation and spaced apart vertically, each of said arms being pivotally connected at one end to the attaching frame and at the other end to the implement frame to provide for relatively vertical movements of the frames, a pin defining the pivot on the implement frame for one of said arms, said pin having means at one end defining a socket, a rod pivotally secured at one end to the attaching frame and extending diagonally across said arms substantially to said socket, and a knob rotatably seated in said socket and having a threaded connection with the adjacent end of said rod, said knob when turned acting to vary the effective length of said rod and adjust the positions of said attaching frame relative to said implement frame.

References Cited in the file of this patent

UNITED STATES PATENTS

| 1,078,741 | McRae | Nov. 18, 1913 |
| 1,855,459 | Strandlund | Apr. 26, 1932 |
| 2,337,662 | Johnson | Dec. 28, 1943 |
| 2,383,386 | Hipple | Aug. 21, 1945 |
| 2,508,345 | Hardy et al. | May 16, 1950 |
| 2,584,217 | Morkoski | Feb. 5, 1952 |

FOREIGN PATENTS

| 496,329 | Belgium | Oct. 2, 1950 |